(12) United States Patent
Zimmerman, II

(10) Patent No.: US 8,944,504 B2
(45) Date of Patent: Feb. 3, 2015

(54) INFLATABLE THIN SEAT

(75) Inventor: Ronald A Zimmerman, II, White Lake, MI (US)

(73) Assignee: Magna Seating Inc, Aurora, Ontario (CA)

( * ) Notice: Subject to any disclaimer, the term of this patent is extended or adjusted under 35 U.S.C. 154(b) by 431 days.

(21) Appl. No.: 13/142,597

(22) PCT Filed: Jan. 6, 2010

(86) PCT No.: PCT/CA2010/000013
§ 371 (c)(1),
(2), (4) Date: Jun. 29, 2011

(87) PCT Pub. No.: WO2010/078653
PCT Pub. Date: Jul. 15, 2010

(65) Prior Publication Data
US 2011/0266855 A1 Nov. 3, 2011

Related U.S. Application Data

(60) Provisional application No. 61/142,679, filed on Jan. 6, 2009.

(51) Int. Cl.
*A47C 4/54* (2006.01)
*B60N 2/22* (2006.01)
*B60N 2/30* (2006.01)
*B60N 2/44* (2006.01)
*B60N 2/20* (2006.01)

(52) U.S. Cl.
CPC ............ *B60N 2/3013* (2013.01); *B60N 2/3065* (2013.01); *B60N 2/309* (2013.01); *B60N 2/4415* (2013.01); *B60N 2/449* (2013.01); *B60N 2/206* (2013.01)

USPC ................. 297/284.6; 297/378.1; 297/452.41

(58) Field of Classification Search
USPC ................. 297/284.6, 378.1, 452.41, DIG. 3, 297/354.13, 354.12
See application file for complete search history.

(56) References Cited

U.S. PATENT DOCUMENTS

| 4,796,955 A | 1/1989 | Williams |
| 4,965,899 A | 10/1990 | Sekido et al. |

(Continued)

FOREIGN PATENT DOCUMENTS

| DE | 10158876 A1 | 6/2003 |
| DE | 10355519 A1 | 6/2005 |

(Continued)

*Primary Examiner* — David R Dunn
*Assistant Examiner* — Richard Lowry
(74) *Attorney, Agent, or Firm* — Miller Canfield

(57) ABSTRACT

A seat assembly includes a seat back operatively coupled to a seat cushion for pivotal movement between seating and folded positions. The seat assembly includes an air bladder. An air control system is operatively coupled to the air bladder for automatically inflating and deflating the air bladder in response to pivoting the seat back between the seating and folded positions. The air control system includes a pressure vessel for storing a predetermined volume of air, a fill valve for controlling air flow from the pressure vessel to the air bladder, a first pressure sensor for monitoring air pressure in the air bladder, a pump for filling the pressure vessel with air, a second pressure sensor for monitoring air pressure in the pressure vessel, a control valve for controlling air flow from the pump to the pressure vessel, and a vent valve for venting air from the or bladder.

8 Claims, 10 Drawing Sheets

(56) References Cited

U.S. PATENT DOCUMENTS

| | | | |
|---|---|---|---|
| 5,529,377 A * | 6/1996 | Miller | 297/284.6 |
| 5,879,053 A | 3/1999 | Lux et al. | |
| 5,975,636 A * | 11/1999 | Koch et al. | 297/354.13 |
| 6,070,942 A | 6/2000 | Barton et al. | |
| 6,203,105 B1 * | 3/2001 | Rhodes, Jr. | 297/284.6 |
| 6,234,578 B1 | 5/2001 | Barton et al. | |
| 7,216,934 B1 | 5/2007 | Kobari | |
| 7,255,399 B2 | 8/2007 | White et al. | |
| 7,311,358 B2 | 12/2007 | White et al. | |

FOREIGN PATENT DOCUMENTS

| | | |
|---|---|---|
| DE | 102004017212 B3 | 6/2005 |
| FR | 2293170 A1 | 7/1976 |
| FR | 2875451 A1 | 3/2006 |
| JP | 2005053262 | 3/2005 |
| JP | 2008264291 | 6/2011 |
| WO | 0113767 A1 | 3/2001 |
| WO | 2008150926 A1 | 12/2008 |

\* cited by examiner

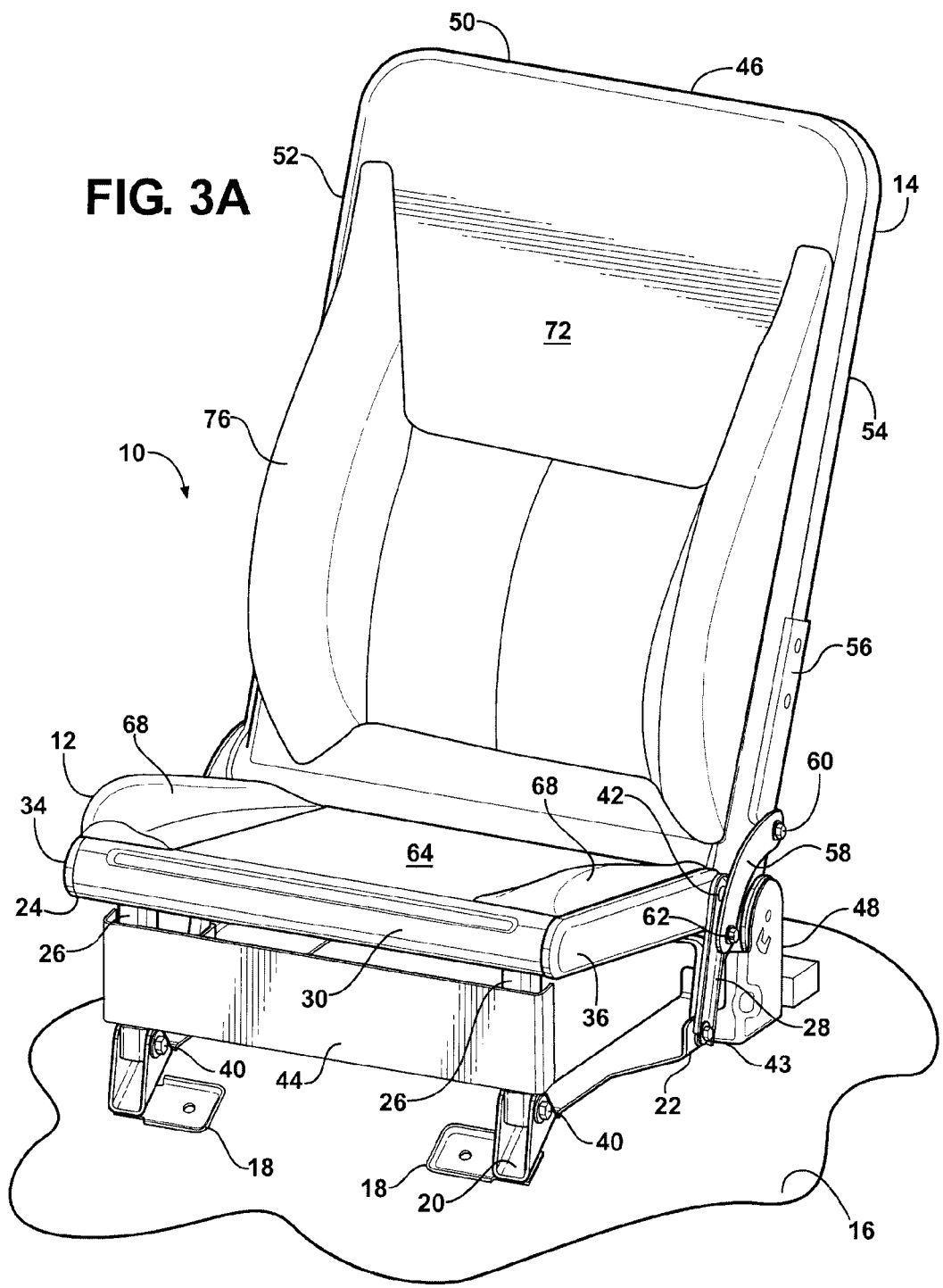

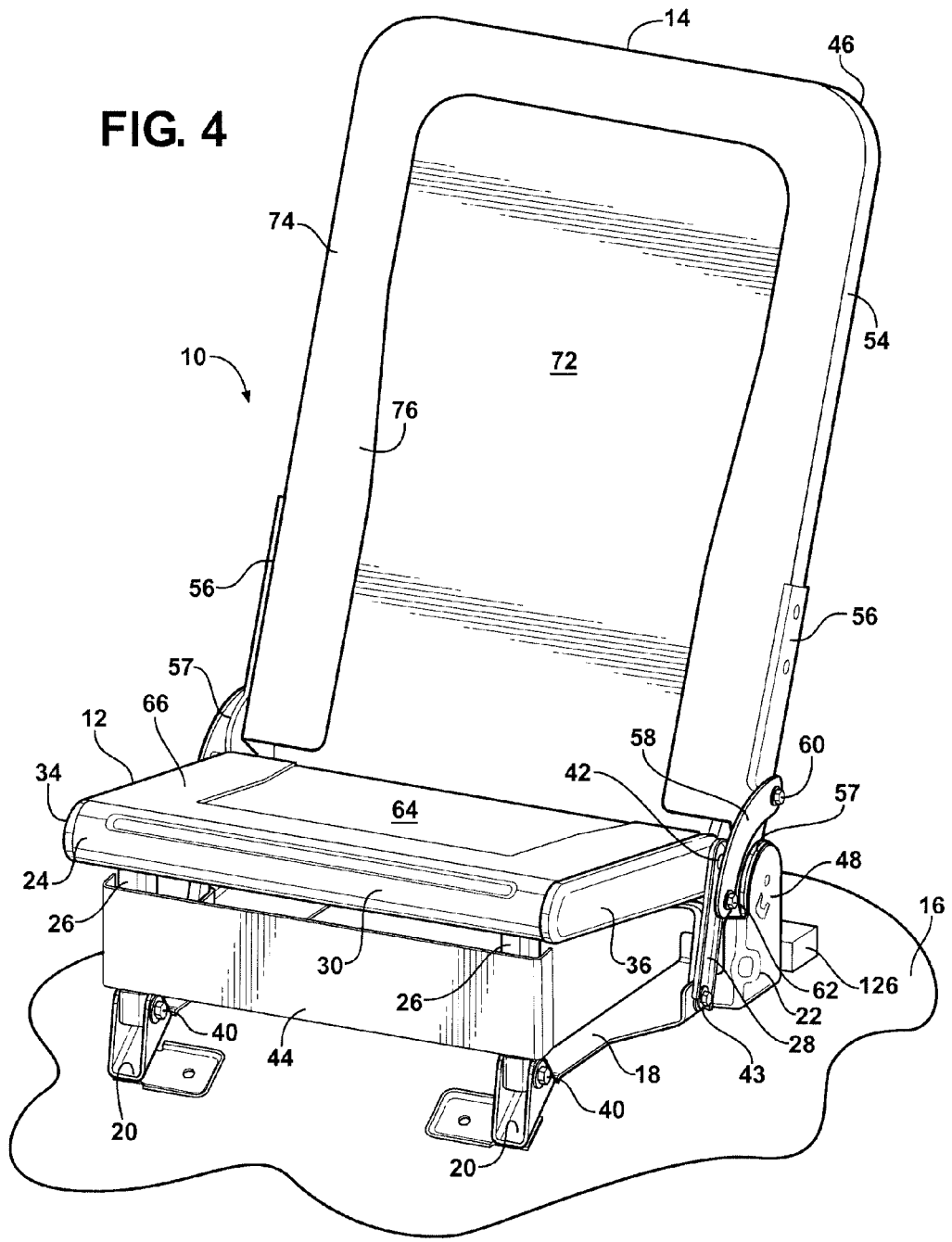

INFLATABLE THIN SEAT

CROSS-REFERENCE TO RELATED APPLICATIONS

This application is a national phase application and claims priority to and all the benefits of, under 35 USC 371, of PCT/CA2010/000013, filed on Jun. 29, 2011, which in turn claims the priority of U.S. Provisional Application No. 61/142,679, filed on Jan. 6, 2009 and entitled "Inflatable Thin Seat". All applications are incorporated herein by reference in their entireties.

BACKGROUND OF THE INVENTION

1. Field of the Invention

The present invention relates to a foldable vehicle seat assembly. More particularly, the present invention relates to a vehicle seat assembly including a seat cushion and seat back having thin seating surfaces and inflatable bolsters that automatically inflate and deflate in response to pivoting the seat back between an upright position and a folded position.

2. Description of Related Art

Automotive vehicles, such as minivans, sport utility vehicles, and trucks include one or more rear seat assemblies having a seat cushion and a seat back for supporting passengers above a vehicle floor. Many such seat assemblies are movable to a stowed position for increasing storage capacity within the vehicle by folding the seat back forwardly to a fold flat position overlying the seat cushion. Additionally, the seat assembly may be lowered toward the vehicle floor as the seat back is folded forwardly to the fold flat position to further increase the available storage capacity of the vehicle. Conventional seat assemblies include thick foam cushions, which have a stowed thickness of 250 to 300 millimeters when the seat assemblies are in the stowed position.

More recently, thin seat assemblies have come into production with thinner foam cushions, which have a reduced stowed thickness of 160 to 200 millimeters when the seat assemblies are in the stowed position. Such seat assemblies with thinner foam cushions sacrifice occupant comfort in order to attain this reduced stowed thickness.

Alternatively, it is well known in the vehicle seating art to provide seat assemblies with mechanically collapsible bolsters. The seat back includes side back bolsters and the seat cushion includes side cushion bolsters that are in a deployed position when the seat assembly is in the seating position. When the seat assembly is moved to the stowed position, the side back bolsters and the side cushion bolsters are mechanically urged to a collapsed position, thereby decreasing the overall thickness of the stowed seat assembly. Such mechanically collapsible bolsters require complicated internal linkages to actuate the bolsters between the deployed and collapsed positions and these linkages limit how thin the stowed seat assembly can be.

It is also well known in the vehicle seating art to use inflatable air bladders in place of foam cushions to attain a desired stowed thickness when the seat assembly is in the stowed position. One such example of this is set forth in U.S. Pat. No. 5,879,053 to Lux et al. In Lux et al., a vehicle seat assembly includes a seat back pivotally coupled to a seat cushion for movement between an upright position and a folded position. The seat cushion includes a seat cushion frame and an inflatable seat cushion air bladder. The seat back includes a seat back frame and an inflatable seat back air bladder. The seat assembly includes a mechanical release valve operatively positioned between the seat back and the seat cushion. The release valve is configured to automatically open to deflate the seat back air bladder and the seat cushion air bladder when the seat back is pivoted toward the folded position. As the seat back is returned to the upright position, the release valve is automatically closed to allow inflation of the seat back air bladder and the seat cushion air bladder by a compressor or pump.

Accordingly, it is desirable to provide a vehicle seat assembly including a thin seat cushion and a thin seat back that is movable to a stowed position to attain a reduced stowed thickness without sacrificing occupant comfort. It is further desirable to provide a vehicle seat assembly including a seat back air bladder and a seat cushion air bladder that are incorporated into an air control system which automatically inflates and deflates the seat back and seat cushion air bladders in response to pivoting the seat back between an upright seating position and a fold flat position.

SUMMARY OF THE INVENTION

According to one aspect of the invention, a vehicle seat assembly includes a seat back operatively coupled to a seat cushion for pivotal movement between an upright seating position and a fold flat position. The seat back and seat cushion each respectively include a seat back air bladder and a seat cushion air bladder. The seat assembly also includes separate air control systems that are operatively coupled to one of the seat back and seat cushion air bladders for automatically inflating and deflating the seat back and seat cushion air bladders in response to pivoting the seat back between the upright seating position and the fold flat position. Each air control system includes a pressure vessel for storing a predetermined volume of air, a fill valve for controlling air flow from the pressure vessel to one of the seat back and seat cushion air bladders, a first pressure sensor for monitoring air pressure in one of the seat back and seat cushion air bladders, a pump for filling the pressure vessel with air, a second pressure sensor for monitoring air pressure in the pressure vessel, a control valve for controlling air flow from the pump to the pressure vessel, and a vent valve for venting air from one of the seat back and seat cushion air bladders.

According to another aspect of the invention, an air control system is provided for inflating and deflating an air bladder in a vehicle seat assembly in response to pivoting the seat back between an upright seating position and a forwardly folded position. The air control system includes a pressure vessel for storing a predetermined volume of air, a fill valve for controlling air flow from the pressure vessel to the air bladder, a first pressure sensor for monitoring air pressure in the air bladder, a pump for filling the pressure vessel with air, a second pressure sensor for monitoring air pressure in the pressure vessel, a control valve for controlling air flow from the pump to the pressure vessel, and a vent valve for venting air from the air bladder.

BRIEF DESCRIPTION OF THE DRAWINGS

Advantages of the present invention will be readily appreciated as the same becomes better understood by reference to the following detailed description when considered in connection with the accompanying drawings wherein:

FIG. 3A is a perspective view of the seat assembly with the trim covers removed to illustrate a seat cushion air bladder and a seat back air bladder according to one embodiment of the invention;

FIG. 4 is a perspective view of the seat assembly with the seat cushion and seat back air bladders removed to illustrate first and second backer panels;

DETAILED DESCRIPTION OF THE PREFERRED EMBODIMENTS

Figure 1:
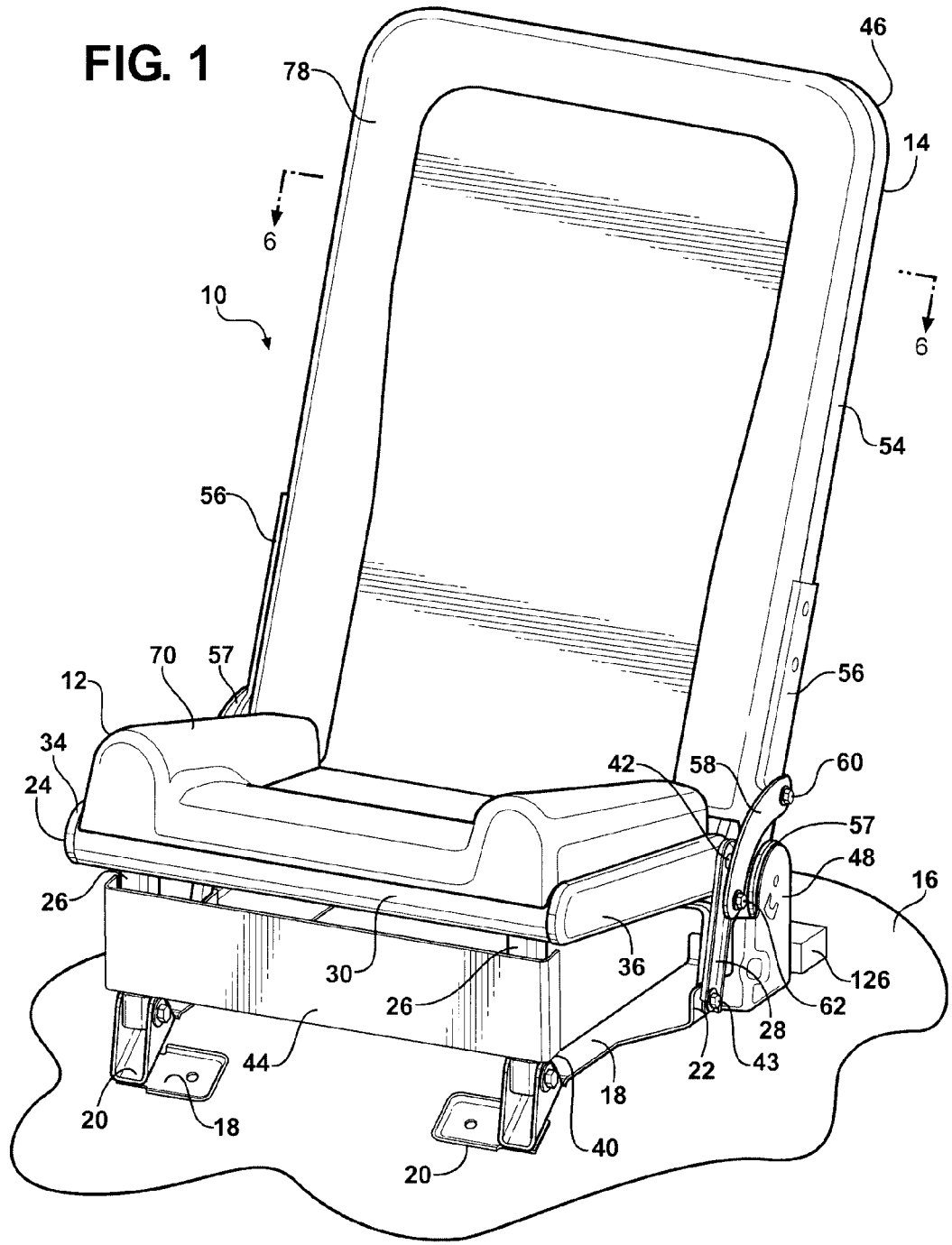
FIG. 1 is a perspective view of a vehicle seat assembly including mesh seating surfaces and inflatable bolsters in a seating position according to one embodiment of the invention.
Figure 2:
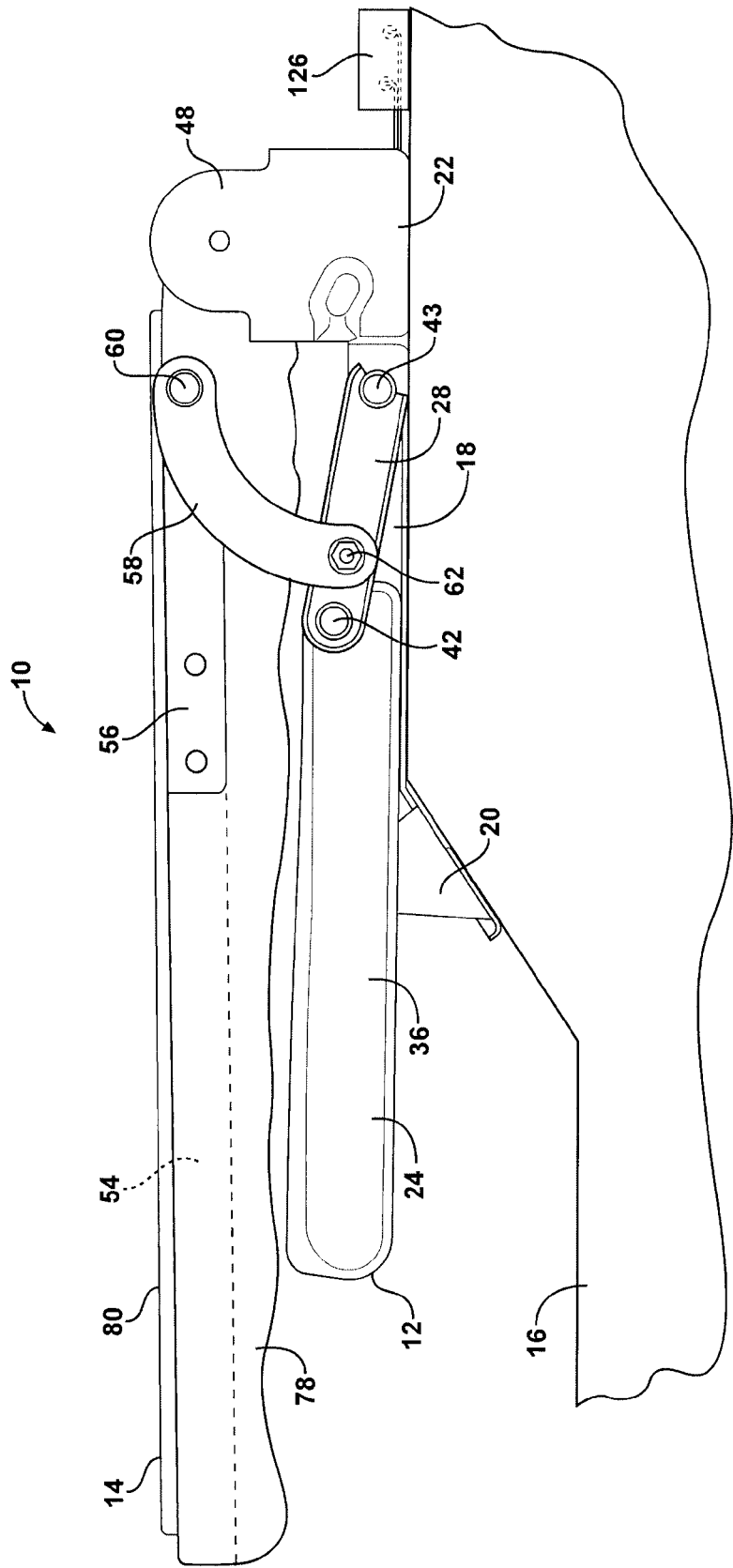
FIG. 2 is a side view of the seat assembly in a stowed position.

Referring to the Figures, wherein like numerals indicate like or corresponding parts throughout the several views, a seat assembly for use in an automotive vehicle is generally shown at 10. The seat assembly 10 includes a seat cushion 12 and a seat back 14 operatively coupled to the seat cushion 12. In FIG. 1, the seat assembly 10 is shown in a seating position for supporting an occupant above a vehicle floor 16. In the seating position, the seat cushion 12 is disposed in a generally horizontal raised position spaced above the vehicle floor 16 and the seat back 14 is disposed in a generally vertical or upright seating position. In FIG. 2, the seat assembly 10 is shown in a stowed position for increasing storage capacity within the vehicle. In the stowed position, the seat cushion 12 is in a generally horizontal lowered position adjacent the vehicle floor 16 and the seat back 14 is folded forwardly to a fold flat position, overlying the seat cushion 12. The seat assembly 10 may also include a head restraint assembly pivotally coupled to the top of the seat back 14 for pivotally movement between an upright use position for supporting an occupants head and a stowed position pivoted forwardly and downwardly in response to pivoting the seat back 14 to the fold flat position as is commonly known in the art.

Figure 7:
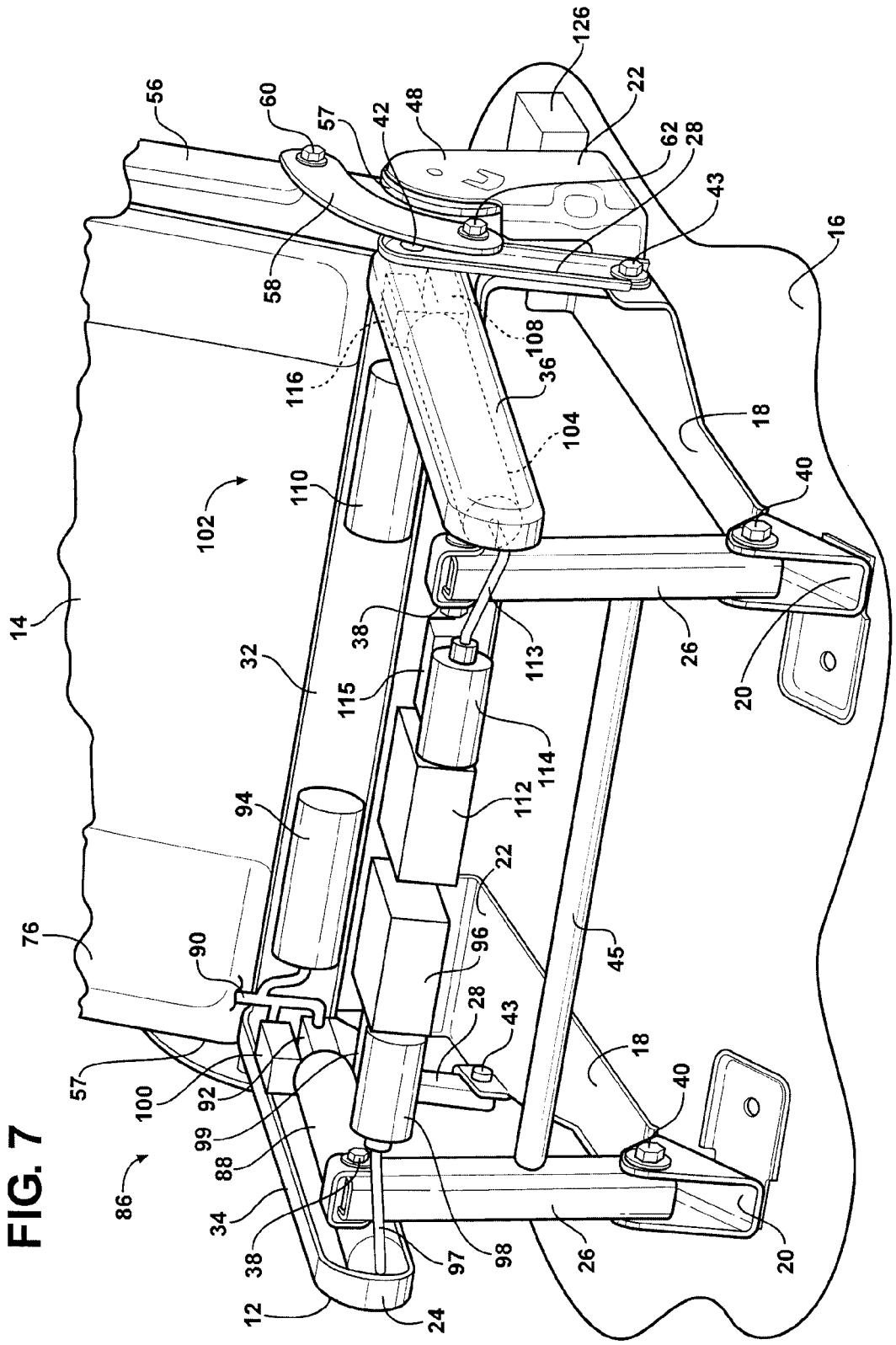
FIG. 7 is a fragmentary, partially cut-away perspective view of the seat assembly including a seat cushion air control system and a seat back air control system for inflating and deflating the seat cushion and seat back air bladders.

In the embodiments shown, a pair of floor brackets 18 are adapted for mounting the seat assembly 10 to the vehicle floor 16. Each floor bracket 18 extends between a forward end 20 and a rearward end 22. The seat cushion 12 includes a rigid seat cushion frame 24 that is pivotally coupled to the floor brackets 18 by a pair of forward legs 26 and a pair of rearward legs 28. The seat cushion frame 24 includes a front member 30 and an opposite rear member 32, shown in FIG. 7, extending laterally between first 34 and second 36 side members. Each of the forward legs 26 is pivotally coupled at an upper pivot 38 to the front member 30 of the seat cushion frame 24 and is pivotally coupled at a lower pivot 40 to the forward end 20 of the respective floor brackets 18. Each of the rearward legs 28 is pivotally coupled at an upper pivot 42 to the respective first 34 and second 36 side members of the seat cushion frame 24 and is pivotally coupled at a lower pivot 43 to the rearward end 22 of the respective floor brackets 18. A shield 44 is attached to and extends laterally between the forward legs 26, as shown in FIG. 1. Behind the shield 44, a cross brace 45 is fixedly secured to and extends laterally between the forward legs 26 to provide added stability thereto, as shown in FIG. 7. It is appreciated that the forward 26 and rearward 28 legs could be pivotally coupled directly to the vehicle floor 16 without varying from the scope of the invention.

The seat back 14 includes a rigid seat back frame 46 that is operatively coupled to a support bracket 48 at the rearward end 22 of each of the floor brackets 18. In the embodiment shown, the support brackets 48 are integrally formed at the rearward end 22 of the respective floor brackets 18, however, it is appreciated that the support brackets 48 may be separate elements fixedly secured directly to the vehicle floor 16 without varying from the scope of the invention. The seat back frame 46 includes an upper member 50, shown in FIG. 5, extending laterally between inner 52 and outer 54 side members. A seat back bracket 56 is fixedly secured to or integrally formed at a lower end of each of the inner 52 and outer 54 side members for coupling the seat back 14 to the support brackets 48. A latch mechanism or disc recliner 57 is operatively coupled between each seat back bracket 56 and the respective support bracket 48. The latch mechanisms 57 are operable between a locked state when the seat back 14 is in the upright seating position and an unlocked state to allow pivotal movement of the seat back 14 between the upright seating position and the fold flat position. The latch mechanisms 57 may also allow selective reclining adjustment of the seat back 14 between a plurality of reclined seating positions, as is well known in the art. The latch mechanism or disc recliner 57 may be actuated by a recliner handle and encased by a trim panel as is commonly known in the art.

A pair of arcuate drive links 58 is pivotally coupled between the seat back 14 and the seat cushion 12 for urging the seat cushion 12 between the raised and lowered positions in response to pivoting the seat back 14 between the upright seating position and the fold flat position. More specifically, each drive link 58 is pivotally coupled at a first pivot 60 to one of the seat back brackets 56 and at a second pivot 62 to the adjacent rearward leg 28, between the upper 42 and lower 43 pivots thereof.

Figure 3B:
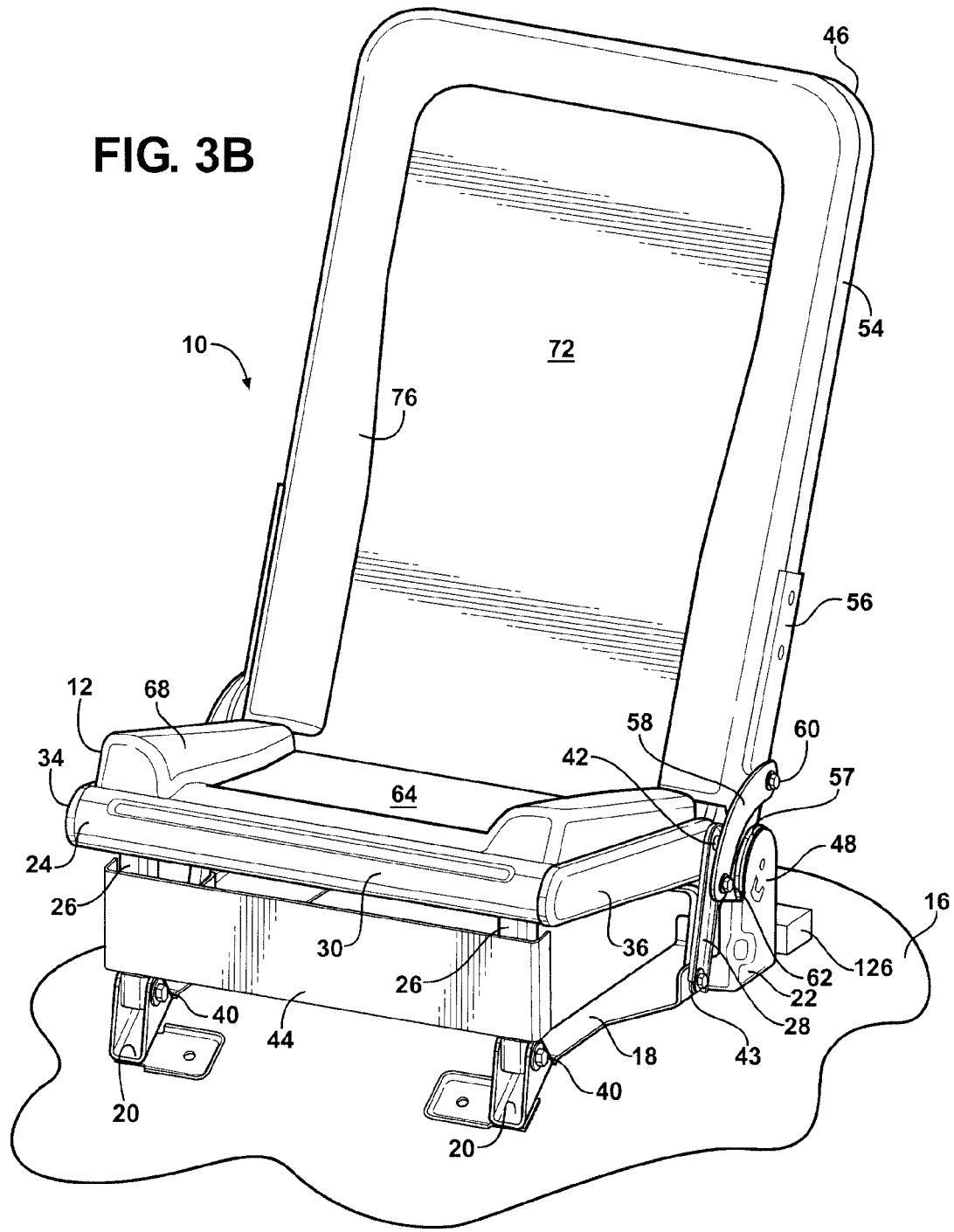
FIG. 3B is a perspective view of the seat assembly with trim covers removed to illustrate a seat cushion air bladder and a seat back air bladder according to an alternative embodiment of the invention.
Figure 5:
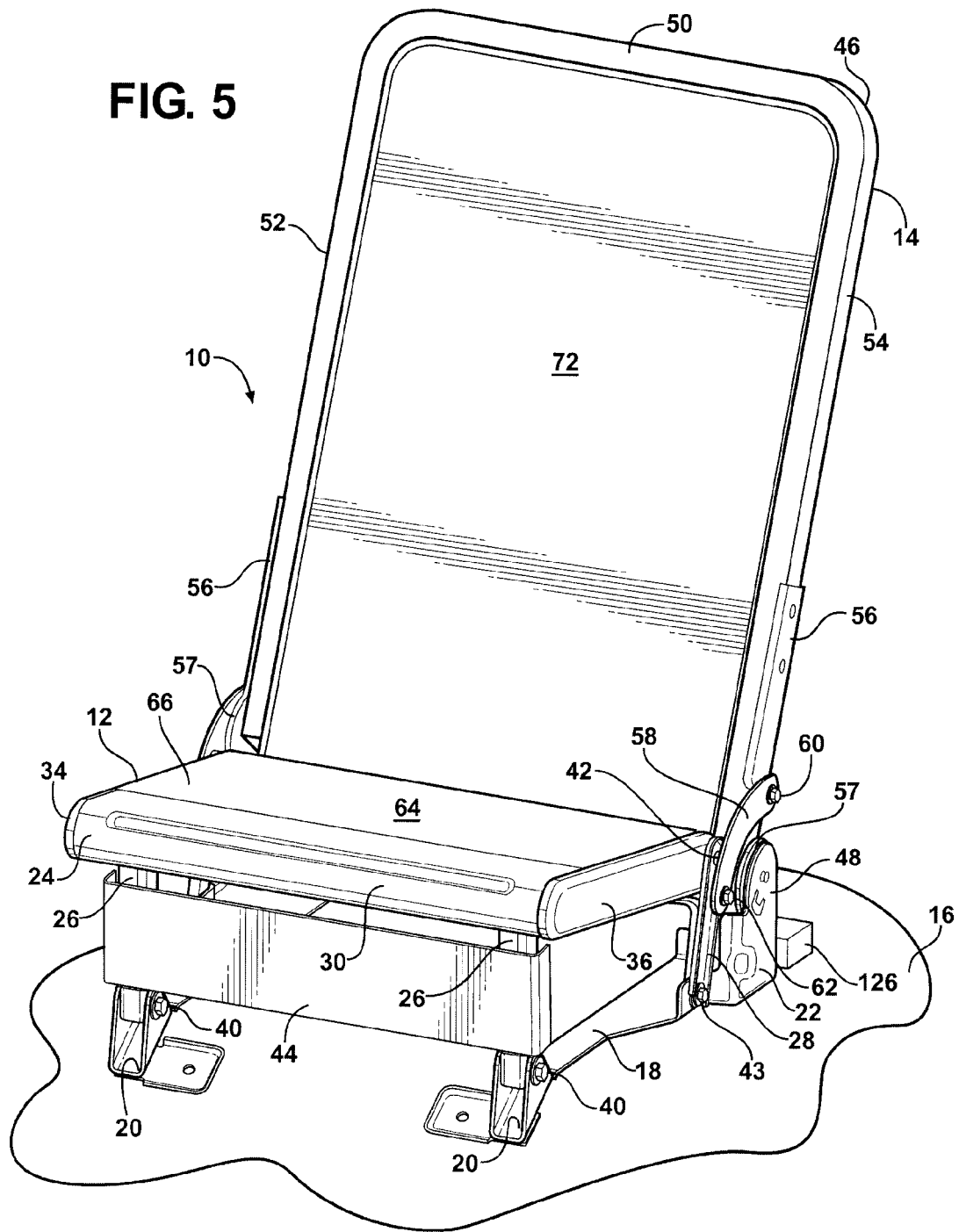
FIG. 5 is a perspective view of the seat assembly with the first and second backer panels removed to illustrate a seat cushion membrane and a seat back membrane.

The construction of the seat cushion 12 includes the seat cushion frame 24 for supporting a seat cushion membrane 64, as shown in FIG. 5, and an optional first backer panel 66 affixed to the seat cushion frame 24, as shown in FIG. 4. The seat cushion membrane 64 may include a mesh membrane, fabric sheet or layer, an elastic membrane, a fabric/foam sheet, or the like as is commonly known in the seating art, extending across and attached to the perimeter of the seat cushion frame 24 for supporting a seat occupant. The first backer panel 66 shown in FIG. 4 extends in a generally U-shape along the first side member 34, across the front member 30, and along the second side member 36 of the seat cushion frame 24. However, it should be appreciated that the first backer panel 66 may form any shape along the seat cushion frame as desired to support an air bladder. More specifically, the first backer panel 66 provides a surface on which a seat cushion air bladder 68 is disposed, as shown in FIGS. 3A and 3B. However, alternatively, the seat cushion air bladder 68 may be disposed directly on the seat cushion membrane 64 without the use of the first backer panel 66. The seat cushion air bladder 68 shown in FIG. 3A includes a pair of spaced apart air bladders, with one extending along each of the first and second side members 34, 36 of the seat cushion frame 24. The seat cushion air bladder 68 shown in FIG. 3B includes a pair of spaced apart air bladders, with one extending along each of the first and second side members 34, 36, and interconnected by an air bladder section extending along the front member 30. The seat cushion air bladder 68 of FIG. 3B extends in the generally U-shape of the first backer panel 66 of FIG. 4. The seat cushion air bladder 68 and first backer panel 66, if present, are then encased by a trim cover 70, as shown in FIG. 1. While the seat cushion air bladder 68 is shown as a single air bladder, it is appreciated that multiple air bladders, as shown in FIG. 3A, could be used without varying from the scope of the invention. Further, the size, shape, and configuration of the seat cushion air bladder 68 may vary without varying from the scope of the invention.

Similarly, the construction of the seat back 14 includes the seat back frame 46 for supporting a seat back membrane 72, as shown in FIG. 5, and an optional second backer panel 74 affixed to the seat back frame 46, as shown in FIG. 4. The seat back membrane 72 may similarly include a mesh membrane, fabric sheet or layer, an elastic membrane, a fabric/foam sheet, or the like as is commonly known in the seating art, extending across and attached to the perimeter of the seat back frame 46 for supporting a seat occupant. The second backer panel 74 shown in FIG. 4 also extends in a generally U-shape along the inner side member 52, across the upper member 50, and along the outer side member 54 of the seat back frame 46. However, it should be appreciated that the second backer panel 74 may form any shape along the seat back frame as desired to support an air bladder. More specifically, the second backer panel 74 provides a surface on which a seat back air bladder 76 is disposed, as shown in FIGS. 3A and 3B. The seat back air bladder 76 shown in FIG. 3A forms a generally H-shape having a pair of side bolster air bladder sections and a center lumbar air bladder section connected therebetween. The seat back air bladder 76 shown in FIG. 3B extends in the generally U-shape of the second backer panel 74 of FIG. 4. However, alternatively, the seat back air bladder 76 may be disposed directly on the seat back membrane 72 without the use of the second backer panel 74. The seat back air bladder 76 and second backer panel 74, if present, are then encased by a trim cover 78, as shown in FIG. 1. While the seat back air bladder 76 is shown as a single air bladder, it is appreciated that multiple air bladders could be used without varying from the scope of the invention. Further, the size, shape, and configuration of the seat back air bladder 76 may vary without varying from the scope of the invention.

Figure 6:
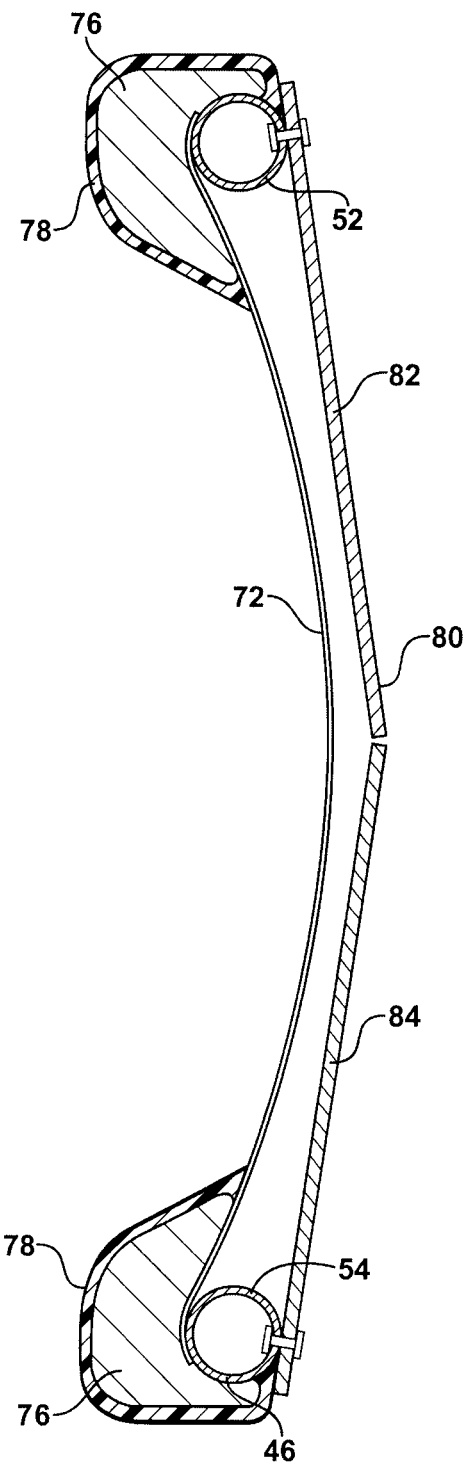
FIG. 6 is a cross-sectional view taken along lines 6-6 in FIG. 1.

Typically, a solid back panel is attached to a back side of a seat back in order to trim and "dress-up" the seat assembly 10. Alternatively, the seat back 14 may include a longitudinally split back panel 80 on a back side thereof, as shown in FIG. 6. The split back panel 80 includes first 82 and second 84 panel portions operatively coupled to the respective inner 52 and outer 54 side members of the seat back frame 46. The first 82 and second 84 panel portions pivot outwardly when a seat occupant is seated on the seat assembly 10 and deflects the membrane 72 of the seat back 14.

When the seat assembly 10 is in the seating position, shown in FIG. 1, the seat cushion air bladder 68 and the seat back air bladder 76 are inflated to provide conventional seating comfort to the seat occupant. When the seat assembly 10 is in the stowed position, shown in FIG. 2, the seat cushion air bladder 68 and the seat back air bladder 76 are deflated in order to attain a reduced stowed thickness of the seat assembly 10 compared with a conventional seat assembly having foam cushions affixed to seating surfaces of a seat back and seat cushion. The seat cushion air bladder 68 and the seat back air bladder 76 are inflated and deflated using an air control system. In the embodiment shown, the seat cushion air bladder 68 and the seat back air bladder 76 are inflated and deflated using separate air control systems, however, it is contemplated that a single air control system may be used without varying from the scope of the invention.

Figure 9:
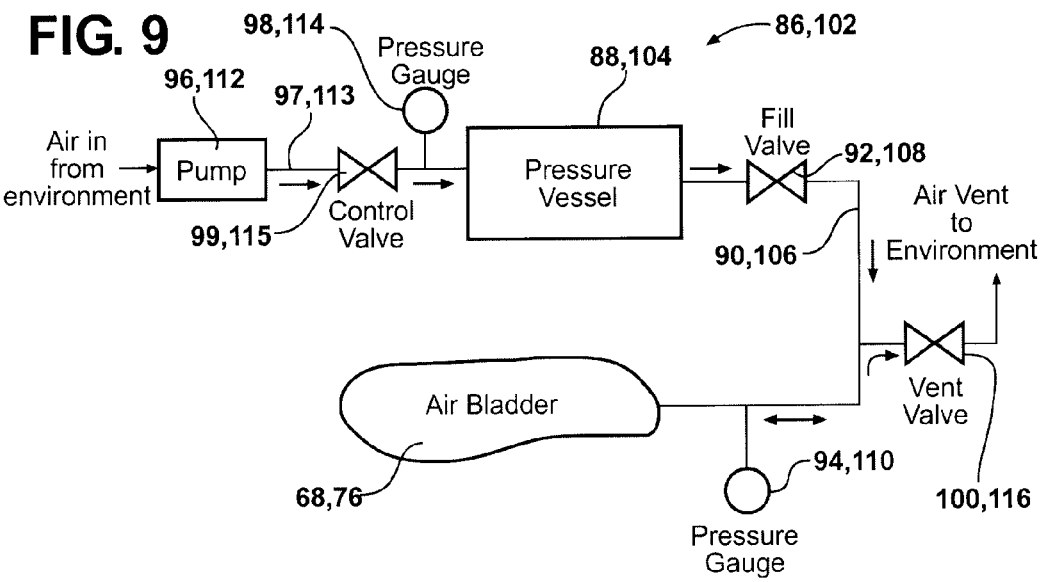
FIG. 9 is a schematic view of the seat cushion and seat back air control systems.

Referring to FIGS. 7 and 9, the seat cushion air bladder 68 is inflated and deflated by a seat cushion air control system 86 that includes a first pressure vessel 88 mounted to the first side member 34 of the seat cushion frame 24. The first pressure vessel 88 is coupled to the seat cushion air bladder 68 by a first flexible air hose 90 that allows air to flow therebetween. A normally closed first fill valve 92, mounted to the first side member 34 adjacent the first pressure vessel 88, is connected to the first air hose 90 in series between the first pressure vessel 88 and the seat cushion air bladder 68 to control air flow from the first pressure vessel 88 to the seat cushion air bladder 68. The first pressure vessel 88 is a storage vessel sized to hold a predetermined volume of air at approximately thirty (30) psi. When the first fill valve 92 is opened, air from the first pressure vessel 88 will flow into and inflate the seat cushion air bladder 68 in approximately three (3) seconds. A first pressure sensor 94 is mounted to the rear member 32 of the seat cushion frame 24 and is coupled to the first air hose 90 adjacent the seat cushion air bladder 68 for measuring air pressure in the seat cushion air bladder 68. When the air pressure in the seat cushion air bladder 68 is at a predetermined full pressure level of approximately three (3) psi the first fill valve 92 is closed. A first pump 96 is mounted to the front member 30 of the seat cushion frame 24 and is coupled to the first pressure vessel 88 by a second flexible air hose 97 for filling the first pressure vessel 88 with air. A second pressure sensor 98 is mounted to the front member 30 adjacent the first pump 96. The second pressure sensor 98 is coupled to the second air hose 97 adjacent the first pressure vessel 88 for measuring air pressure in the first pressure vessel 88. A normally closed first control valve 99, mounted to the front member 30 adjacent the first pump 96, is connected to the second air hose 97 in series between the first pump 96 and the first pressure vessel 88 to control air flow from the first pump 96 to the first pressure vessel 88. Whenever the air pressure in the first pressure vessel 88 drops below a predetermined low pressure level of approximately 30 psi, due to fluctuations in outside ambient air temperature or when air is released from the first pressure vessel 88 to fill the seat cushion air bladder 68 for example, the first control valve 99 is opened and the first pump 96 is activated to re-fill the first pressure vessel 88. When the air pressure in the first pressure vessel 88 is approximately 30 psi the first control valve 99 is closed. A normally open first vent valve 100 is mounted to the first side member 34 adjacent the first fill valve 92. The first vent valve 100 is coupled to the first air hose 90 adjacent the first pressure sensor 94 for venting air from the seat cushion air bladder 68 to the atmosphere to deflate the seat cushion air bladder 68. It should be appreciated that components of the seat cushion air control system 86 may be located and secured in other locations on the seat assembly without varying from the scope of the invention.

The seat back air bladder 76 is inflated and deflated by a seat back air control system 102 that includes a second pressure vessel 104 mounted to the second side member 36 of the seat cushion frame 24. The second pressure vessel 104 is coupled to the seat back air bladder 76 by a third flexible air hose 106, shown in FIG. 8, that allows air to flow therebetween. The third air hose 106 is routed in such as way to allow pivotal movement of the seat back 14. A normally closed second fill valve 108, mounted to the second side member 36 adjacent the second pressure vessel 104, is connected to the third air hose 106 in series between the second pressure vessel 104 and the seat back air bladder 76 to control air flow from the second pressure vessel 104 to the seat back air bladder 76. The second pressure vessel 104 is a storage vessel sized to hold a predetermined volume of air at approximately thirty (30) psi. When the second fill valve 108 is opened, air from the second pressure vessel 104 will flow into and inflate the seat back air bladder 76 in approximately three (3) seconds. A third pressure sensor 110 is mounted to the rear member 32 of the seat cushion frame 24 and is coupled to the third air hose 106 adjacent the seat back air bladder 76 for measuring air pressure in the seat back air bladder 76. When the air pressure in the seat back air bladder 76 is at a predetermined full pressure level of approximately three (3) psi the second fill valve 108 is closed. A second pump 112 is mounted to the front member 30 of the seat cushion frame 24 and is coupled to the second pressure vessel 104 by a fourth flexible air hose 113 for filling the second pressure vessel 104 with air. A fourth pressure sensor 114 is mounted to the front member 30 adjacent the second pump 112. The fourth pressure sensor 114 is coupled to the fourth air hose 113 adjacent the second pressure vessel 104 for measuring air pressure in the second pressure vessel 104. A normally closed second control valve 115, mounted to the front member 30 adjacent the second pump 112, is connected to the fourth air hose 113 in series between the second pump 112 and the second pressure vessel 104 to control air flow from the second pump 112 to the second pressure vessel 104. Whenever the air pressure in the second pressure vessel 104 drops below a predetermined low pressure level of approximately 30 psi, due to fluctuations in outside ambient air temperature or when air is released from the second pressure vessel 104 to fill the seat back air bladder 76 for example, the second control valve 115 is opened and the second pump 112 is activated to re-fill the second pressure vessel 104. When the air pressure in the second pressure vessel 104 is approximately 30 psi the second control valve 115 is closed. A normally open second vent valve 116 is mounted to the second side member 36 adjacent the second fill valve 108. The second vent valve 116 is coupled to the third air hose 106 adjacent the third pressure sensor 110 for venting air from the seat back air bladder 76 to the atmosphere to deflate the seat back air bladder 76. It is contemplated that if an automotive vehicle has an onboard air supply the first 96 and second 112 pumps could be eliminated without varying from the scope of the invention. It should also be appreciated that components of the seat back air control system 102 may be located and secured in other locations on the seat assembly without varying from the scope of the invention.

Figure 8:
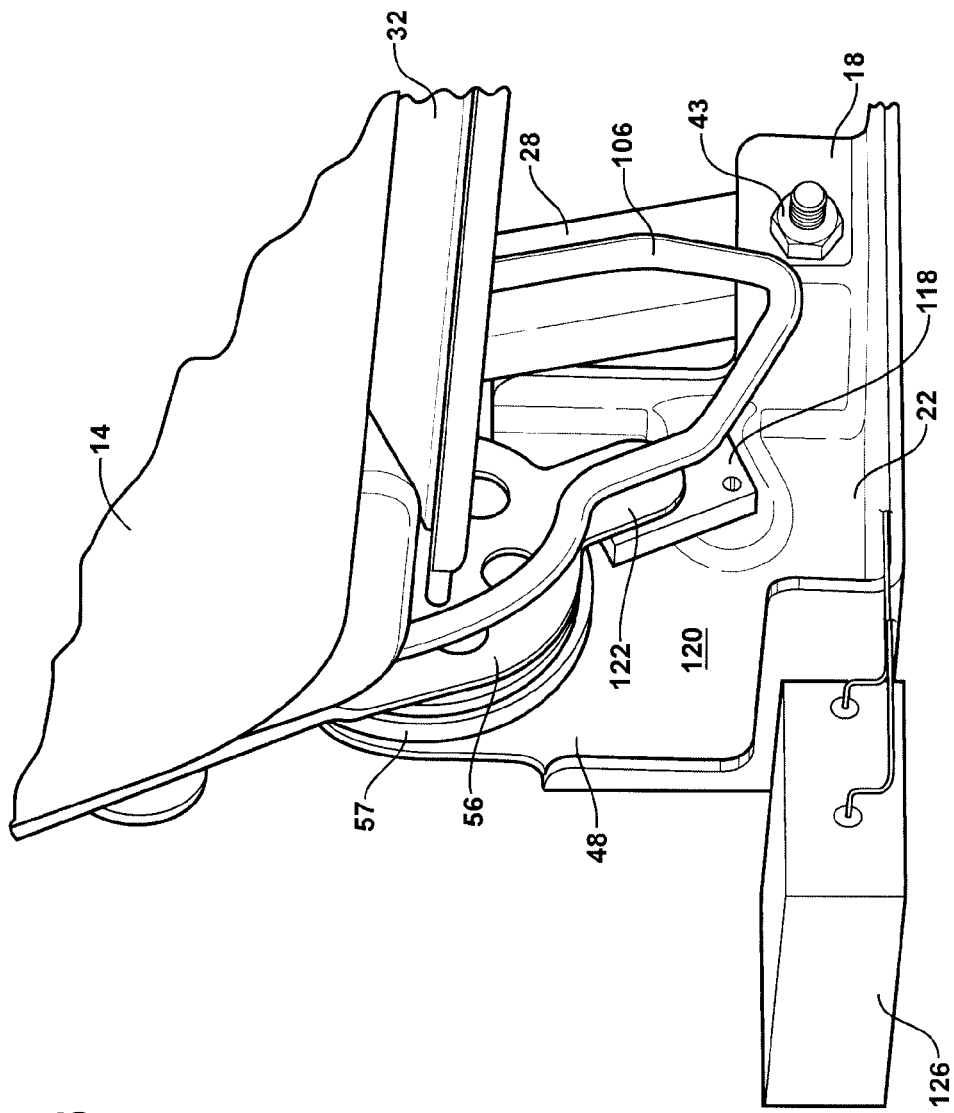
FIG. 8 is a fragmentary, rear perspective view of the seat assembly illustrating a seat fold sensor.

The seat cushion air control system 86 and the seat back air control system 102 are actuated in response to pivoting the seat back 14 between the upright seating position and the fold flat position. The position of the seat back 14 is detected by a seat fold sensor 118 that is mounted to an inner surface 120 of one of the support brackets 48, as shown in FIG. 8. The seat fold sensor 118 is triggered by a tab 122 extending from the seat back bracket 56 that is adjacent to the seat fold sensor 118.

Figure 10:
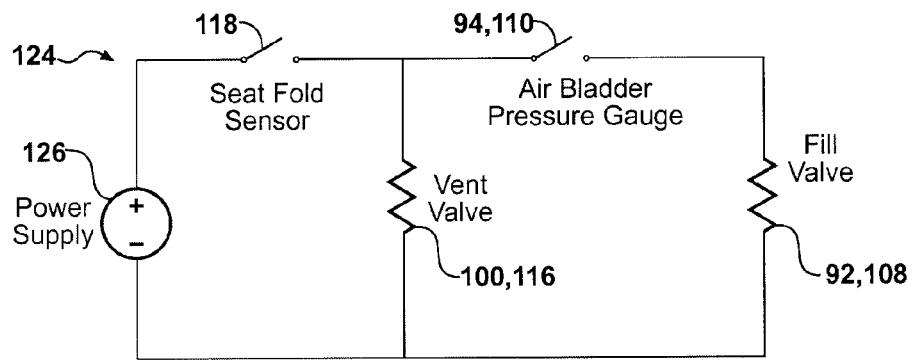
FIG. 10 is a schematic view of a first electrical portion of the seat cushion and seat back air control systems.
Figure 11:
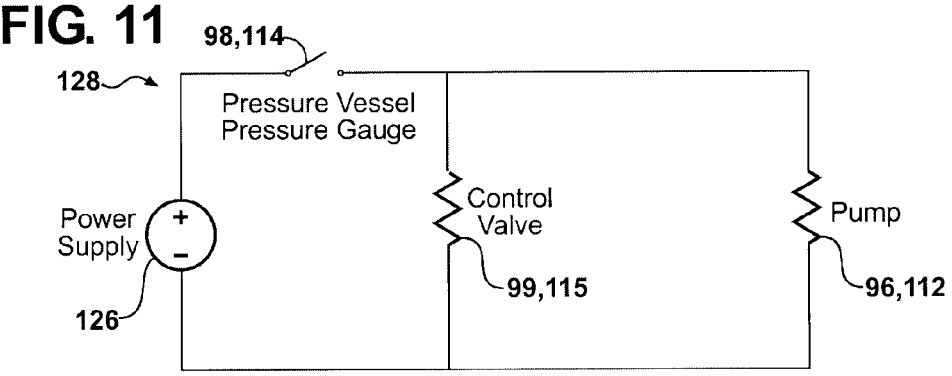
FIG. 11 is a schematic view of a second electrical portion of the seat cushion and seat back air control systems.

Referring to FIGS. 10 and 11, the seat cushion air control system 86 and the seat back air control system 102 are represented schematically as electrical circuits. In a first electrical circuit 124, shown in FIG. 10, the seat fold sensor 118 is represented as a switch, the first 92 and second 108 fill valves are represented as resistors, the first 94 and third 110 pressure sensors are represented as switches, and the first 100 and second 116 vent valves are represented as resistors. The normally closed first fill valve 92 and the first pressure sensor 94 are electrically arranged in a series branch and the normally open first vent valve 100 is electrically arranged in parallel with the series branch of the first fill valve 92 and the first pressure sensor 94. The seat fold sensor 118 and a power supply, such as a DC power supply 126, are electrically arranged in series with the parallel arrangement of the first vent valve 100 and the series branch of the first fill valve 92 and first pressure sensor 94. Similarly, the normally closed second fill valve 108 and the third pressure sensor 110 are electrically arranged in a series branch and the normally open second vent valve 116 is electrically arranged in parallel with the series branch of the second fill valve 108 and the third pressure sensor 110. The seat fold sensor 118 and the power supply 126 are electrically arranged in series with the parallel arrangement of the second vent valve 116 and the series branch of the second fill valve 108 and third pressure sensor 110. It is appreciated that in an automotive vehicle the power supply 126 may be a vehicle battery.

When the seat back 14 is pivoted from the upright seating position toward the fold flat position, the seat fold sensor 118 detects the absence of the tab 122 and the seat fold sensor 118 is switched open, which causes the first 100 and second 116 vent valves to open to deflate the seat cushion air bladder 68 and the seat back air bladder 76, respectively. Alternatively, when the seat back 14 is pivoted from the fold flat position toward the upright seating position, the seat fold sensor 118 detects the presence of the tab 122 and the seat fold sensor 118 is switched close, which causes the first 100 and second 116 vent valves to close. At the same time, if the first pressure sensor 94 detects low air pressure in the seat cushion air bladder 68, i.e., the seat cushion air bladder 68 is deflated, the first pressure sensor 94 is switched close, which causes the first fill valve 92 to open to inflate the seat cushion air bladder 68. Once the air pressure in the seat cushion air bladder 68 reaches the full pressure level of approximately three (3) psi the first pressure sensor 94 is switched open, which causes the first fill valve 92 to close. Similarly, if the third pressure sensor 110 detects low air pressure in the seat back air bladder 76, i.e., the seat back air bladder 76 is deflated, the third pressure sensor 110 is switched close, which causes the second fill valve 108 to open to inflate the seat back air bladder 76. Once the air pressure in the seat back air bladder 76 reaches the full pressure level of approximately 3 psi the third pressure sensor 110 is switched open, which causes the second fill valve 108 to close.

The seat cushion air control system 86 and the seat back air control system 102 are also independently actuated in response to detecting air pressure below the low pressure level in the respective first 88 and second 104 pressure vessels. In a second electrical circuit 128, shown in FIG. 11, the first 96 and second 112 pumps are represented as resistors, the second 98 and fourth 114 pressure sensors are represented as switches, and the first 99 and second 115 control valves are represented as resistors. The normally closed first control valve 99 and the first pump 96 are electrically arranged in parallel, and the power supply 126 and the second pressure sensor 98 are electrically arranged in series with the parallel arrangement of the first control valve 99 and the first pump 96. Similarly, the normally closed second control valve 115 and the second pump 112 are electrically arranged in parallel, and the power supply 126 and the fourth pressure sensor 114 are electrically arranged in series with the parallel arrangement of the second control valve 115 and the second pump 112.

When the second pressure sensor 98 detects air pressure of less than approximately thirty (30) psi in the first pressure vessel 88 the second pressure sensor 98 is switched close, which causes the normally closed first control valve 99 to open and activates the first pump 96 to re-fill the first pressure vessel 88 regardless of whether the seat back 14 is in the upright seating position or the fold flat position. Once the air pressure in the first pressure vessel 88 reaches approximately 30 psi the second pressure sensor 98 is switched open, which deactivates the first pump 96 and causes the first control valve 99 to close. Similarly, when the fourth pressure sensor 114 detects air pressure of less than approximately 30 psi in the second pressure vessel 104 the fourth pressure sensor 114 is switched close, which causes the normally closed second control valve 115 to open and activates the second pump 112 to re-fill the second pressure vessel 104 regardless of whether the seat back 14 is in the upright seating position or the fold flat position. Once the air pressure in the second pressure vessel 104 reaches approximately 30 psi the fourth pressure sensor 114 is switched open, which deactivates the second pump 112 and causes the second control valve 115 to close.

In operation, beginning with the seat assembly 10 in the seating position and the seat back 14 in the upright seating position, the seat cushion air bladder 68 and the seat back air bladder 76 are both inflated to provide conventional seating comfort. The latch mechanisms 57 are actuated to the unlocked state to pivot the seat back 14 from the upright seating position to the fold flat position. As the seat back 14 pivots forwardly and downwardly, the drive links 58 urge the rearward legs 28 to pivot forwardly and downwardly, thereby moving the seat cushion 12 from the raised position to the lowered position. At the same time, the seat fold sensor 118 detects the absence of the tab 122, which opens the first 100 and second 116 vent valves to deflate the seat cushion air bladder 68 and the seat back air bladder 76, respectively. The seat assembly 10 is now in the stowed position with the reduced stowed thickness.

To return the seat assembly 10 to the seating position, the seat back 14 is pivoted from the fold flat position to the upright seating position. As the seat back 14 pivots upwardly and rearwardly, the drive links 58 urge the rearward legs 28 to pivot upwardly and rearwardly, thereby moving the seat cushion 12 from the lowered position to the raised position. At the same time, the seat fold sensor 118 detects the presence of the tab 122, which closes the first 100 and second 116 vent valves. Simultaneously, the first 94 and third 110 pressure sensors detect that the seat cushion air bladder 68 and the seat back air bladder 76 are deflated, which opens the first 92 and second 108 fill valves to inflate the seat cushion air bladder 68 and the seat back air bladder 76, respectively. Once the air pressure in the seat cushion air bladder 68 and the seat back air bladder 76 reaches the full pressure level of approximately three (3) psi, the first 92 and second 108 fill valves close. The second 98 and fourth 114 pressure sensors will then detect air pressure below the low pressure level of approximately thirty (30) psi in the first 88 and second 104 pressure vessels. In response, the first 99 and second 115 control valves open and the first 96 and second 112 pumps are activated to re-fill the first 88 and second 104 pressure vessels. Once the air pressure in the first 88 and second 104 pressure vessels reaches approximately 30 psi, the first 99 and second 115 control valves close.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly adapted to be mounted to a floor of an automotive vehicle comprising:
   a floor bracket extending between a forward end and a rearward end adapted for mounting said seat assembly to the floor of the vehicle;
   a seat cushion operatively coupled to said floor bracket;
   a seat back operatively coupled to said seat cushion for pivotal movement between an upright seating position and a forwardly folded position overlying said seat cushion;
   at least one of a seat back air bladder and a seat cushion air bladder; and
   an air control system mounted to said seat assembly and operatively coupled to said at least one of said seat back air bladder and said seat cushion air bladder for automatically inflating and deflating said at least one of said seat back air bladder and said seat cushion air bladder in response to pivoting said seat back between said upright seating position and said forwardly folded position, wherein said air control system includes a pressure vessel for storing a predetermined volume of pressurized air, a fill valve connected in fluid communication between said pressure vessel and at least one of said seat back air bladder and said seat cushion air bladder for controlling air flow from said pressure vessel to said at least one of said seat back air bladder and said seat cushion air bladder, a first pressure sensor coupled to at least one of said seat back air bladder and seat cushion air bladder for monitoring air pressure in said at least one of said seat back air bladder and said seat cushion air bladder, a pump connected in fluid communication with said pressure vessel for filling said pressure vessel with said predetermined volume of pressurized air and maintaining a predetermined pressure of air in said pressure vessel, a second pressure sensor coupled to said pressure vessel for monitoring air pressure in said pressure vessel, a control valve connected in fluid communication between said pump and said pressure vessel for controlling air flow from said pump to said pressure vessel, and a vent valve coupled to at least one of said seat back air bladder and said seat cushion air bladder for venting air from said at least one of said seat back air bladder and said seat cushion air bladder;
   a seat fold sensor operatively coupled between said seat back and said seat cushion for detecting the position of said seat back in said upright seating position and said folded position and actuating said air control system, said seat fold sensor mounted to one of said floor bracket and said seat back and a trigger tab extending from the other one of said floor bracket and said seat back for interacting with said seat fold sensor and triggering said seat fold sensor in response to pivotal movement of said seat back between said upright seating position and said forwardly folded position thereby actuating said air control system; and wherein
   said control valve is opened and said pump is activated to fill said pressure vessel to said predetermined pressure of air in response to said second pressure sensor detecting a predetermined low pressure level in said pressure vessel below said predetermined pressure of air.

2. A seat assembly as set forth in claim 1 wherein said vent valve is opened in response to pivoting said seat back from said upright seating position toward said forwardly folded position thereby automatically deflating said at least one of said seat back air bladder and said seat cushion air bladder.

3. A seat assembly as set forth in claim 2 wherein said vent valve is closed and said fill valve is opened in response to pivoting said seat back from said forwardly folded position toward said upright seating position thereby automatically inflating said at least one of said seat back air bladder and said seat cushion air bladder.

4. A seat assembly as set forth in claim 3 wherein said fill valve is closed in response to said first pressure sensor detecting a predetermined full pressure level in said at least one of said seat back air bladder and said seat cushion air bladder.

5. A seat assembly as set forth in claim 4 wherein said seat cushion includes a seat cushion frame extending between a forward end and a rearward end adjacent said seat back for supporting a seat cushion membrane for supporting said seat cushion air bladder on said seat cushion frame.

6. A seat assembly as set forth in claim 5 wherein said seat back includes a seat back frame extending between an upper member and a lower seat back bracket for supporting a seat back membrane for supporting said seat back air bladder on said seat cushion frame.

7. A seat assembly as set forth in claim 6 further including a pair of forward legs pivotally coupled to said seat cushion frame adjacent said forward end and a pair of rearward legs pivotally coupled to said seat cushion frame adjacent said rearward end for moving said seat cushion between a raised seating position spaced above the floor of the vehicle and a lowered position adjacent the floor of the vehicle.

8. A seat assembly as set forth in claim 7 further including a recliner mechanism operatively coupled to said seat back frame for providing pivotal movement of said seat back between said upright seating position and said folded position and a drive link having a first end pivotally coupled to said seat back bracket and an opposite second end pivotally coupled to one of said rear legs for automatically driving said seat cushion between said raised position and said lowered position in response to pivotal movement of said seat back between said upright seating position and said folded position.

* * * * *